US010047943B2

(12) United States Patent
Storey et al.

(10) Patent No.: US 10,047,943 B2
(45) Date of Patent: Aug. 14, 2018

(54) WATER-COOLED LED LIGHTING SYSTEM FOR INDOOR FARMING

(71) Applicants: Nathaniel R. Storey, Laramie, WY (US); Damon Henry Smith, Laramie, WY (US); Kenneth Stutzman, Windsor, CO (US); Lim Jing Yi, Singapore (SG)

(72) Inventors: Nathaniel R. Storey, Laramie, WY (US); Damon Henry Smith, Laramie, WY (US); Kenneth Stutzman, Windsor, CO (US); Lim Jing Yi, Singapore (SG)

(73) Assignee: MINN, LLC, South San Francisco, CA (US)

( * ) Notice: Subject to any disclaimer, the term of this patent is extended or adjusted under 35 U.S.C. 154(b) by 0 days.

(21) Appl. No.: 15/351,478

(22) Filed: Nov. 15, 2016

(65) Prior Publication Data
US 2017/0146226 A1 May 25, 2017

Related U.S. Application Data

(60) Provisional application No. 62/257,431, filed on Nov. 19, 2015.

(51) Int. Cl.
*A01G 7/04* (2006.01)
*F21K 9/272* (2016.01)
(Continued)

(52) U.S. Cl.
CPC .............. *F21V 29/56* (2015.01); *A01G 7/045* (2013.01); *A01G 9/26* (2013.01); *F21K 9/272* (2016.08);
(Continued)

(58) Field of Classification Search
CPC .......... F21V 29/56; F21V 29/57; F21V 29/58; F21V 29/59; F21Y 2103/10; F21S 4/28
See application file for complete search history.

(56) References Cited

U.S. PATENT DOCUMENTS

| | | | |
|---|---|---|---|
| 6,880,952 B2 * | 4/2005 | Kiraly | F21V 29/004 348/131 |
| 2009/0190350 A1 * | 7/2009 | Tseng | F21S 2/005 362/249.01 |

(Continued)

FOREIGN PATENT DOCUMENTS

WO PCT/CN2014/084718      1/2014

*Primary Examiner* — Alexander Garlen
(74) *Attorney, Agent, or Firm* — Patent Law Office of David G. Beck (57) ABSTRACT

A lighting system for indoor farming for delivering high intensity light while reducing or eliminating heat loads in a growing environment is provided. The lighting system comprises a lighting housing having a first end, a second end, a first side, a second side opposite the first side, a third side between the first side and the second side, and a fourth side opposite the third side. A first LED board is mounted to the first side and a second LED board is mounted to the second side. A first shroud covers the first LED board and a second shroud covers the second LED board. A coolant passage is formed completely through the lighting housing. A coolant liquid is receivable through the coolant passage. The coolant liquid provides active cooling of the lighting housing from heat created by the first and second LED boards.

17 Claims, 4 Drawing Sheets

(51) Int. Cl.
*F21K 9/66* (2016.01)
*F21V 17/00* (2006.01)
*F21V 19/00* (2006.01)
*F21V 29/56* (2015.01)
*F21V 29/77* (2015.01)
*F21V 31/00* (2006.01)
*A01G 9/26* (2006.01)
*F21Y 103/10* (2016.01)
*F21Y 115/10* (2016.01)

(52) U.S. Cl.
CPC .............. *F21V 17/002* (2013.01); *F21K 9/66* (2016.08); *F21V 19/0055* (2013.01); *F21V 29/77* (2015.01); *F21V 31/00* (2013.01); *F21Y 2103/10* (2016.08); *F21Y 2115/10* (2016.08); *Y02A 40/274* (2018.01)

(56) References Cited

U.S. PATENT DOCUMENTS

| | | |
|---|---|---|
| 2011/0075416 A1 | 3/2011 | Chou et al. |
| 2011/0304270 A1 | 12/2011 | Scarpelli |
| 2014/0185300 A1 | 7/2014 | Martinez et al. |
| 2015/0284266 A1* | 10/2015 | Matsui .................... C02F 1/325 422/24 |
| 2015/0308631 A1* | 10/2015 | Gorman ................ F21V 15/013 362/221 |

* cited by examiner

WATER-COOLED LED LIGHTING SYSTEM FOR INDOOR FARMING

The present application claims benefit of priority from U.S. provisional patent application Ser. No. 62/257,431, filed Nov. 19, 2015, entitled "Lighting System".

BACKGROUND OF THE INVENTION

1. Field of the Invention

This invention relates generally to a water-cooled LED lighting system and, more particularly, the invention relates to a water-cooled LED lighting system for indoor farming providing continuously circulating water through the LEDs thereby delivering high intensity light while reducing or eliminating heat loads in the growing environment and lowering operational expenses typically attributed to expensive, energy-draining HVAC systems.

2. Description of the Prior Art

Indoor grow lights have traditionally used incandescent or fluorescent light sources. Recently, grow lights have been introduced which use light emitting diodes (LEDs) light sources. LEDs are new a lighting technology in the grow light industry. LEDs emit light at specific wavelength bands depending upon the type of diode. Because of this narrow wavelength band a white LED is actually comprised of a mix of different color LEDs to create the white light. The intensity of an LED may be controlled as well allowing the LEDs to be dimmed.

Like any other industry, the agricultural industry seeks to increase production and lower operating costs of its products. Generally, plants exposed to more blue light tend to grow stouter and with broader leads. Plants exposed to more red light tend to grow faster and taller but with thinner stems and smaller leaves.

LED technology has made significant gains in recent years. The efficiency and light output of LED's has increased exponentially since the 1960's, with a doubling occurring about every 36 months. As a result, LED technology can now be successfully deployed for grow light applications, to provide high-efficiency, low cost, safe and long-lasting grow light solutions. However, the performance of LED grow lights varies, and there is an ongoing need in the grow light industry for high-performance grow lights that maximize photosynthesis, plant growth and flowering.

Basically, the field of light emitting diodes (LED) is a rapidly advancing technology that has the promise to significantly reduce power consumption for general lighting as well as for indoor horticulture. Over the last five years, ever brighter and more efficient LED emitters in the 3-5 W range have been developed which is a significant improvement over the LEDs of 10 years ago that did not exceed 50 mW. When used for indoor growing, LED based lights have the advantage of being higher efficiency than other lights. In addition, LEDs can be focused on the photo-synthetically active regions of the light spectrum, namely blue and red (400-500 nm and 600-700 nm respectively) without wasting energy on the green (500-600 nm) region which is not very useful to plants during the vegetative phase.

SUMMARY

The present invention includes a lighting system for indoor farming for delivering high intensity light while reducing or eliminating heat loads in a growing environment. The lighting system comprises a lighting housing having a first end, a second end opposite the first end, a first side, a second side opposite the first side, a third side between the first side and the second side, and a fourth side opposite the third side. A first LED board is mounted to the first side of the lighting board. A first shroud is releasably securable to the lighting housing and covering the first LED board. A coolant passage is formed completely through the lighting housing from the first end to the second end of the lighting housing. A coolant liquid is receivable through the coolant passage. The coolant liquid passes through the coolant passage providing active cooling of the lighting housing from heat created by the first LED board. Active cooling allows for the light to consume power at a higher rate, without overheating the LEDs despite that a bar form factor is used.

In addition, the present invention includes a lighting system for indoor farming for delivering high intensity light while reducing or eliminating heat loads in a growing environment. The lighting system comprises a lighting housing having a first end, a second end opposite the first end, a first side, a second side opposite the first side, a third side between the first side and the second side, and a fourth side opposite the third side. A first LED board is mounted to the first side of the lighting board and a second LED board is mounted to the second side of the lighting board. A first shroud releasably is securable to the lighting housing and covering the first LED board and a second shroud is releasably securable to the lighting housing and covering the second LED board. A coolant passage is formed completely through the lighting housing from the first end to the second end of the lighting housing. A coolant liquid is receivable through the coolant passage. The coolant liquid passes through the coolant passage providing active cooling of the lighting housing from heat created by the first LED board.

The present invention further includes a method for delivering, high intensity light while reducing or eliminating heat loads in a growing environment. The method comprises providing a lighting housing having a first end, a second end opposite the first end, a first side, a second side opposite the first side, a third side between the first side and the second side, and a fourth side opposite the third side, mounting a first LED board to the first side of the lighting board, releasably securing a first shroud to the lighting housing and covering the first LED board, mounting a second LED board to the second side of the lighting board, releasably securing a second shroud to the lighting housing and covering the second LED board, forming a coolant passage completely through the lighting housing from the first end to the second end of the lighting housing, introducing a coolant liquid through the coolant passage, and providing active cooling of the lighting housing from heat created by the first LED board.

DETAILED DESCRIPTION OF THE PREFERRED EMBODIMENTS

As illustrated in FIGS. 1-12, the present invention is a water-cooled LED lighting system for indoor farming, indicated generally at 10, providing continuously circulating water adjacent the LEDs 11 thereby delivering high intensity light while reducing or eliminating heat loads in the growing environment and lowering operational expenses typically attributed to expensive, energy-draining HVAC systems. By managing heat with the lighting system 10 instead of an expensive HVAC system, growers benefit from higher light intensities without the adverse effects of conventional systems for high plant production and customer convenience.

Figures 1, 2, 3:
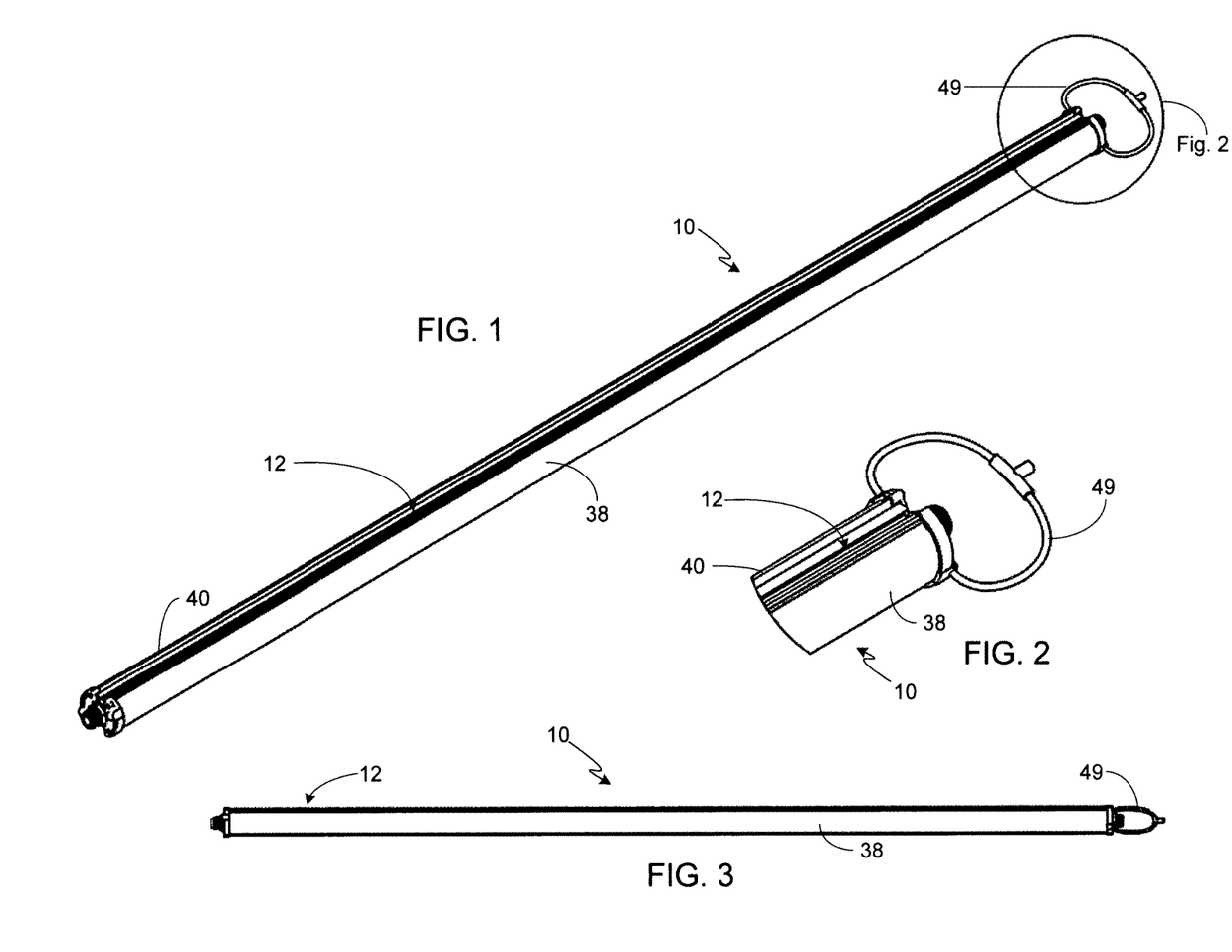
FIG. 1 is a perspective view illustrating the water-cooled LED lighting system for indoor farming, constructed in accordance with the present invention.
FIG. 2 is close up a perspective view illustrating a gasket of the water-cooled lighting system for indoor farming, constructed in accordance with the present invention.
FIG. 3 is a top plan view illustrating the water-cooled LED lighting system for indoor farming, constructed in accordance with the present invention.

As illustrated in FIGS. 1-3, the lighting system 10 of the present invention includes a lighting housing 12 having a first end and a second end. Preferably, the lighting housing 12 has a substantially square or rectangular cross-sectional configuration having a first side 14, a second side 16 substantially opposite the first side 14, a third side 18 between the first side 14 and the second side 16, and a fourth side 20 substantially opposite the third side 18. It should be noted that while the lighting housing 12 has been described and illustrated as having a substantially square or rectangular cross-sectional configuration, it is within the scope of the present invention for the lighting housing 12 to have a different cross-sectional configuration including, but not limited to, round, oval, triangular, polygon, etc.

The lighting housing 12 of the lighting system 10 of the present invention is preferably constructed from an extruded aluminum material. The use of aluminum in the construction of the lighting housing 12 allows any heat from the lighting system 10 to be better dissipated than other materials. However, while the lighting housing 12 has been described and illustrated as being formed through an extrusion process and constructed from an aluminum material, it is within the scope of the present invention to form the lighting housing 12 through a different process and/or using different materials.

In addition, the lighting housing 12 of the lighting system 10 of the present invention includes a first T-slot 22 formed in the third side 18 of the lighting housing 12 and a second T-slot 24 formed in the fourth side 20 of the lighting housing 12. The first T-slot 22 and the second T-slot 24 of the lighting housing 12 of the lighting system 10 are designed to grip attachments that slide into or are otherwise secured to the first T-slot 22 and/or the second T-slot 24 of the lighting housing 12, holding the attachment tight and keeping the use of the lighting housing 12 as flexible as possible depending on the needs of the user by allowing different attachments to be used for different scenarios. Another attachment securable to the first T-slot 22 and/or the second T-slot 24 is hanging brackets for vertical as well as horizontal orientation of the lighting system 10. Another attachment securable to the first T-slot 22 and/or the second T-slot 24 is a heat sink (for non-water cooled applications) as well as a fin-type condenser attachment for condensing and collecting water, thereby reducing humidity. As an additional consideration for lowering costs and reducing weight, the first T-slot 22 and/or the second T-slot 24 can have gaps of material cut from the lighting housing 12.

Figures 4, 5, 6:
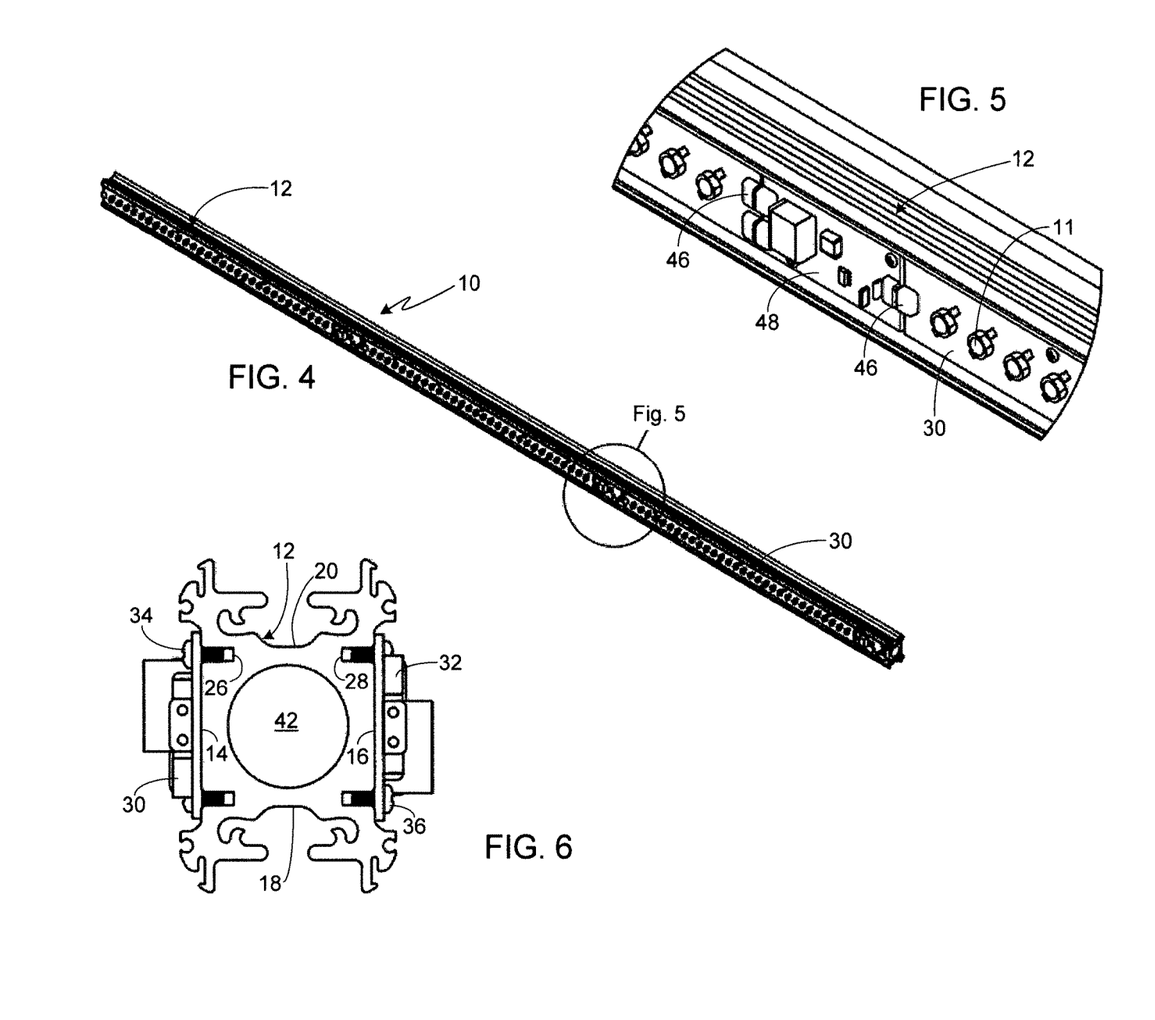
FIG. 4 is a perspective view illustrating the water-cooled LED lighting system for indoor farming, constructed in accordance with the present invention, with an LED board mounted on a lighting housing.
FIG. 5 is a close up perspective view illustrating the lighting board of the water-cooled LED lighting system for indoor farming of FIG. 4, constructed in accordance with the present invention.
FIG. 6 is a sectional end view illustrating the lighting housing of the water-cooled LED lighting system for indoor farming, constructed in accordance with the present invention, with the LED board mounted on the lighting housing and a coolant passage thrilled through the housing.

Additionally, as best illustrated in FIGS. 4-6, the first side 14 of the lighting housing 12 of the lighting system 10 of the present invention includes, a pair of spaced first mounting channels 26 formed in the first side 14 of the lighting housing 12 and the second side 16 of the lighting housing 12 includes a pair of space second mounting channels 28 formed in the second side 16 of the lighting housing 12. The first mounting channels 26 and the second mounting channels 28 preferably extend along the entire length of the light housing 12 from the first end of the lighting housing 12 to the second end of the lighting housing 12 although extending the first mounting channels 26 and/or the second mounting channels 28 less than the entire length of the light housing 12 or having multiple segments of the first mounting channels 26 and/or the second mounting channels 28 along the length of the lighting housing 12 is within the scope of the present invention.

As best illustrated in FIGS. 4-6, the lighting system 10 of the present invention further includes a first LED board 30 mounted to the first side 14 of the lighting board 12 and a second LED 32 mounted to the second side 16 of the lighting board 12. Preferably, a plurality of first screws 34 extend through the first LED board 30 into the first mounting channels 26 to releasably secure the first LED board 30 to the first side 14 of the lighting housing 12 and a plurality of second screws 36 extend through the second LED board 32 into the second mounting channels 28 to releasably secure the second LED board 32 to the second side 16 of the lighting housing 12. A thermal heat sink can be positioned between the first LED board 30 and the first side 14 of the lighting housing 12 and another thermal heat sink can be positioned between the second LED board 32 and the second side 16 of the lighting housing 12 to further increase heat dissipation from the first LED board 30 and the second LED board 32 into the lighting housing 12. The heat sink can be a thermal paste, heat sink tape, or other material that increases the transfer of heat from the first LED board 30 and the second LED board 32 into the lighting housing 12.

While the lighting system 10 of the present invention has been described and illustrated as having a first LED board 30 and a second LED board 32, it is within the scope of the present invention to use only one LED board or to use more than two LED boards in addition to the first LED board 30 and the second LED board 32.

The first LED board 30 and/or the second LED board 32 of the lighting system 10 of the present invention can be constructed in a variety of spectrums of LEDs depending on the crop they will be used for and user preference. Several LED boards 30, 32 can be attached to each other on one lighting housing 12 allowing for various lengths to be used. In the event an LED board 30, 32 is damaged or goes out, the LED boards 30, 32 can be easily removed and replaced by removing the first screws 34 and/or the second screws 36 providing lower maintenance costs. Additionally, first LED boards 30 and second LED boards 32 can be swapped in out with different percentages of red, white, and/or blue LEDs 11 as necessary. It should be noted that the LED boards 30, 32 may contain other light colors and wavelengths and is powered by power supplies. The power supplies can be kept close to LED boards 30, 32 or in another room with additional controls. The LED boards 30, 32 are designed for high plant production and customer convenience.

Figure 7:
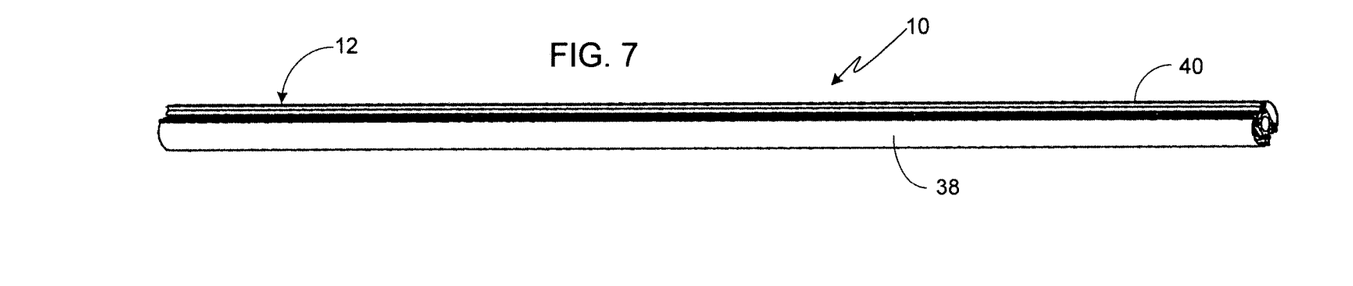
FIG. 7 is a perspective view illustrating the lighting housing of the water-cooled LED lighting system for indoor farming, constructed in accordance with the present invention, with a shroud mounted to the lighting housing and covering the LED board.
Figure 8:
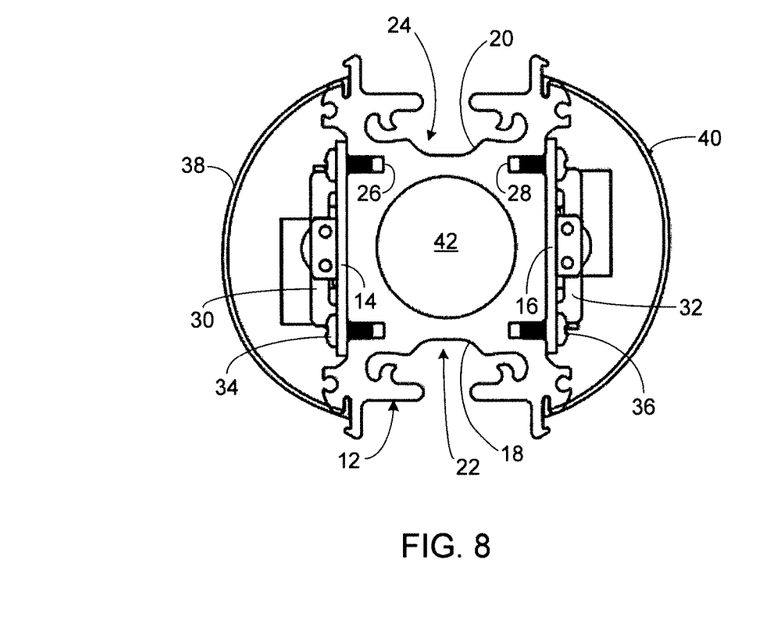
FIG. 8 is a sectional end view illustrating the lighting housing of the water-cooled LED lighting system for indoor farming of FIG. 7, constructed in accordance with the present invention, with the coolant passage formed through the lighting housing.

The lighting system 10 of the present invention additionally includes a first shroud 38 for covering the first LED board 30 and a second shroud 40 for covering the second LED board 32. The first shroud 38 and the second shroud 40 diffuse light generated by the first LED board 30 and the second LED board 32, respectively, and protects the LED boards 30, 32 and circuits from water damage. The first shroud 38 is releasably positionable over the first LED board 30 covering the first side 14 of the lighting housing 12. The second shroud 40 is releasably positionable over the second LED board 32 covering the second side 16 of the lighting housing 12.

Both the first shroud 38 and the second shroud 40 of the lighting system 10 of the present invention, have a first edge and a second edge. Preferably, the first edge and second edge of the first shroud 38 and the first edge and the second edge of the second shroud 40 are bent inward to be receivable in a set of grooves formed in the lighting housing 12 nearingly adjacent the first T-slot 22 and the second T-slot 24. The shrouds 38, 40 are is preferably constructed from a resilient material such that the first edge and the second edge of the first shroud 38 and the first edge and the second edge of the second shroud 40 is releasably retained in position within the grooves. Easy attachment and detachment allow for access to the first LED board 30 and the second LED board 32 and can be easily placed and removed by the user as the first shroud 38 and/or the second shroud 38 is resilient to keep it releasably fixed in place. While the preferred material for the first shroud 38 and the second shroud 40 is a flexible plastic material, any number of materials can be used to construct the shrouds 38, 40 to increase light diffusion or increase light transmission.

Furthermore, the lighting housing 12 of the lighting system 10 of the present invention includes a coolant passage 42 providing active cooling of the lighting housing 12 thereby enabling higher wattage LED boards 30, 32 to be used. Preferably, the coolant passage 42 is round and formed in the approximate center of the lighting housing 12 and extending from the first end of the lighting housing 12 to the second end of the lighting housing 12. While the coolant passage 42 has been described as being round, it is within the scope of the present invention for the coolant passage 42 to be any shape including, but not limited to, oval, triangular, square, rectangular, etc.

Chilled water travels through the coolant passage 42 of the lighting housing 12 of the lighting system 10 of the present invention, pumped through coolant passage 42 formed in the lighting housing 12 to a cooling device, and back to the lighting housing 12 in a closed circuit. The chilled water is circulated through the lighting housing 12 causing condensation on the heat sink lighting housing 12. While the present application describes chilled water as the coolant, other types of coolant are within the scope of the present invention. Cooling the fluid after running through the lighting housing 12 is much more cost efficient than cooling, air if the heat from the LED boards 30, 32 was allowed to dissipate to the environment. Threading at least the ends of the coolant passage 42 of the lighting housing 12 allows fittings and tubing to be easily connected, as will be described in further detail below.

Figure 12:
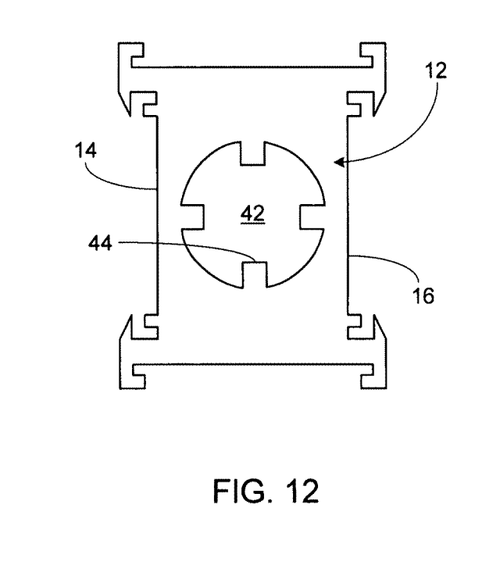
FIG. 12 is a perspective view of the lighting housing of the water-cooled LED lighting system for indoor farming, constructed in accordance with the present invention, having channels on all sides of the lighting housing for additional attachments and a plurality of heat fins formed within the coolant passage for increased heat transfer.

In an embodiment of the present invention, the coolant passage 42 of the lighting housing 12 of the lighting system 10 of the present invention includes at least one heat fin 44 extending from the lighting housing 12 and into the coolant passage 42. In a preferred embodiment, the light housing 12 includes a plurality of heat fins 44 extending from the lighting housing 12 and into the coolant passage 44. The heat fins 44 provide a greater surface area for the dissipation of heat from the lighting housing 12, created by the LED boards 30, 32, to the chilled fluid.

Fundamentally, the lighting system 10 of the present invention allows high-intensity LEDs 11 to be used in confined environments without inefficient air-cooling or heat transfer to the atmosphere of the growing environment. The lighting system 10 utilizes a pumping system that runs chilled water through and the around the power supply and through the lighting housing 12 that the LED boards 30, 32 are mounted on, removing heat and cooling the LED boards 30, 32 to optimal operating temperatures. The lighting housing 12 is such that LED boards 30, 32 can be manufactured separately and then attached directly to the lighting housing 12 or attached via a bracket system. As cooling liquid is circulated through the lighting housing 12, massive amounts of heat can be removed very quickly and efficiently. In an extreme capacity, the lighting housing 12 can be used with both LEDs 11 and traditional heat sink attachments to both light and dehumidify the growing environment. The vertically oriented lighting housing 12 allows condensation to run down the heat sink fins and extrusion to be collected at the bottom by a vacuum operated collection system.

As previously stated, the LED aluminum core LED boards 30, 32 of the lighting system 10 of the present invention are attached to the lighting housing 12 with a plurality of screws, heat sink tape, or the like and covered with a shroud allowing the user to insert and remove the shrouds 38, 40 to access the LED boards 30, 32. The LED boards 30, 32 are connected to each other with simple push-in connectors 46 allowing individual boards to be removed and replaced on the lighting housing 12 by hand, and then re-covered with the shroud material 38, 40 allowing users to customize their lighting system 10, either with custom LED boards 30, 32 or with custom shroud material 38, 40, such as clear polycarbonate or acrylic for top-lighting, or an opaque poly ethylene for inter-lighting applications requiring diffuse light. A power supply board 48 with voltage regulating components can be positioned between adjacent LED boards 30, 32.

Figures 9, 10, 11:
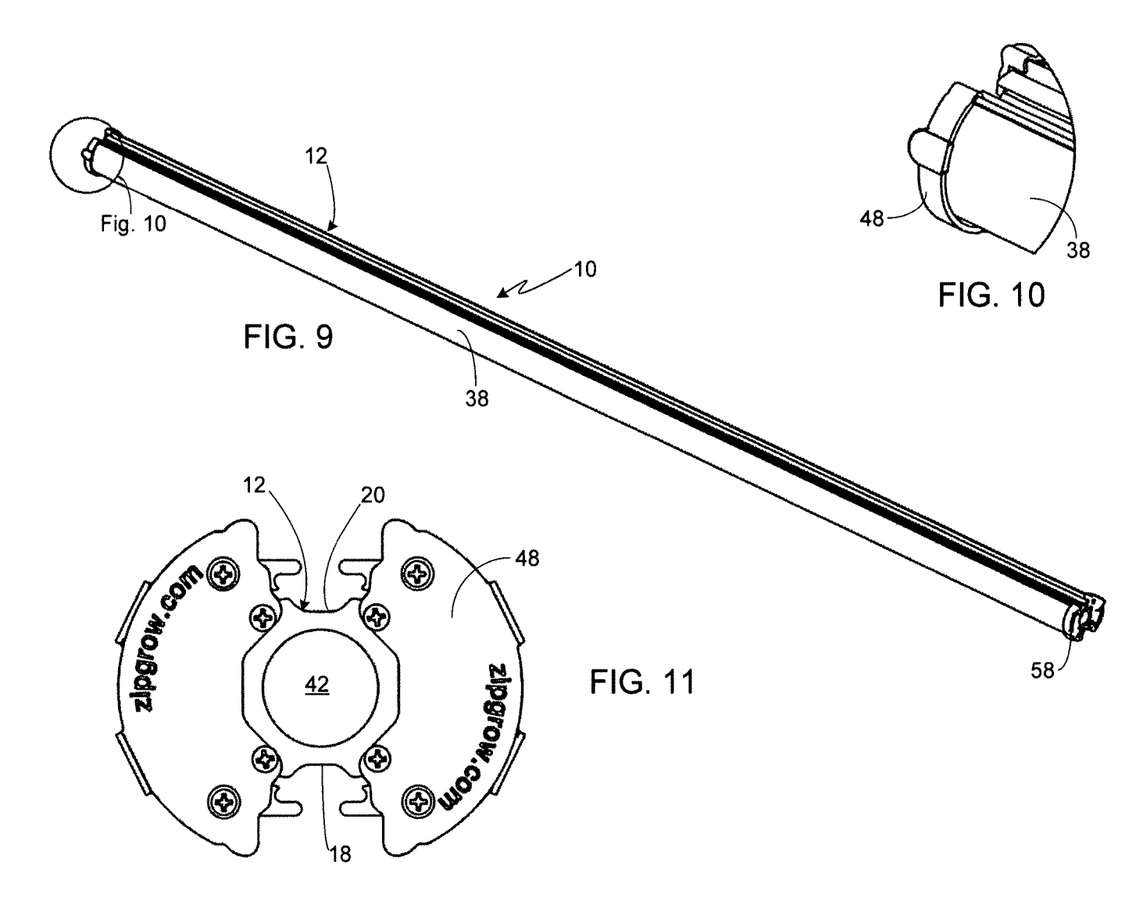
FIG. 9 is a perspective view illustrating the water-cooled LED lighting system for indoor farming, constructed in accordance with the present invention, with an end cap mounted to the lighting housing.
FIG. 10 is a close up perspective view illustrating the end cap of the water-cooled LED lighting system for indoor farming, constructed in accordance with the present invention.
FIG. 11 is a top plan view illustrating the end cap of the water-cooled LED lighting system for indoor farming, constructed in accordance with the present invention.

The first end and the second end of the lighting housing 12 of the lighting system 10 of the present invention are capped with a first end cap 48 and a second end cap 50 secured to the lighting housing 12 by at least one screw. The first end cap 48 and the second end cap 20 keep the area under the first shroud 38 containing the first LED board 30 and the area under the second shroud 40 containing the second LED board 32 effectively sealed and protected from moisture. The first end cap 48 and the second end cap 50 can also be used for mounting lights on pulleys and hanger systems as well as brackets. In one embodiment, the first end cap 48 and the second end cap 50 have a cupped extension on the sides (that don't contain LED boards) with attachments for vacuum tubes so that condensation from the LED boards 30, 32 can trickle down condensation adaptors and be captured by the cupped extensions and removed via a system of vacuum tubes. A cable 49 mounted to the first end and the second of the lighting housing 12 plugs into a D.C. cable for power. There are multiple lengths of cable 49 available.

The lighting system 10 of the present invention consists of the hollow lighting housing (typically aluminum extrusion) with a coolant passage 42 that is typically round and corresponds with a standard plumbing diameters. If it is square or another shape, a fitting is made allowing standard plumbing fittings to be attached to both ends. The outside of the lighting housing 12 can be square or angular, with channels for aluminum core circuit boards 30, 32 to be mounted on a single side, on opposing sides or on multiple sides down the length of the lighting housing 12. The lighting housing 12 has grooves that receive the edges of the shroud material 38, 40, or additional fittings that slide or snap into them. Shroud materials 38, 40 consist of long strips of plastic that are flexible and are received within the grooves on either side of the lighting housing 12 in a way that makes them functional and easy to work with and replace in situ. The plastic material can be either clear or slightly opaque in order to create harsh or diffuse light depending on grower needs.

To plumb the lighting housing 12 of the lighting system 10 of the present invention, the ends of the lighting housing 12 are simply threaded and a standard barbed plumbing fitting or NPT tap is threaded into the ends of the lighting housing 12. Poly or flexible tubing is used to connect the extrusion to the main chilled water system or to other lighting housings in series. The LED circuit boards 30, 32, once mounted and optionally coated with epoxy are simply attached via a connector to the LED driver for that lighting housing 12, which is often found overhead, integrated into the chilled water system with a watertight hood or cabinet. Chilled water from a reservoir and chiller is circulated through the entire system via a pump removing heat from the drivers and LEDs 11 prolonging their lives, cooling the lighting housing 12 for dehumidification, and cooling the growing environment artificially using the fin-type condenser attachments to remove heat from the growing area.

The lighting system 10 of the present invention utilizes innovative "quick change" circuit boards 30, 32 allowing rapid insertion or removal of the LED boards 30, 32 from the lighting system 10. Installation at the factory or in the field is streamlined by a simple "poke" of the wire into the connector with no screw termination or lever actuation is necessary. Furthermore, by inserting a small tool, the spring loaded contact is released, allowing individual wires to be released. In this way, an LED board 30, 32 can be field removed and replaced without removing adjacent boards. In addition, the quick change LED boards 30, 32 are low voltage (48 VDC), eliminating the need for re-wiring the fixture by an electrician. Quick change LED boards 30, 32 also allow modifications to the light spectrum, yielding flexibility in growing different crops. By keeping different wavelength LED boards 30, 32 on site, the growing process can be "fine-tuned" or even upgraded to an entirely new light spectrum without the removal of the physical light fixture.

In sum, the lighting system 10 of the present invention allows for high-intensity Light Emitting Diodes (LEDs) 11 to be placed on an extremely small water cooled heat sink for applications where large amounts of illumination are required with minimal materials, minimal space use, and reduced dissipation of heat from the LEDs 11 to the air around them. Increasingly, high-density horticultural scenarios require this type of lighting, but LED lighting resembles traditional lighting, being single-unit, plug and play, air-cooled fixtures. These designs are expensive to produce and require a lot of material for heat sinks. In the course of designing extremely high-density growing systems, it was discovered that even energy efficient, low-heat LED lighting can contribute to excessive heat in the growing environment due to being air cooled. This lighting was also too bulky as a result of the housings, heat sinks, drivers and fans, causing space use issues in the growing space. Water cooling is three times more efficient, than air cooling, and in this application can be used to cool the LEDs, drivers as well as the growing environment and dehumidify in an extremely space-efficient way. The lighting system 10 of the present invention opens the doors to lower capital expense in equipping and designing indoor growing environments.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A lighting system for indoor farming for delivering high intensity light while reducing or eliminating heat loads in a growing environment, the lighting system comprising:
   a lighting housing fabricated from a metal and having a first end, a second end opposite the first end, a first side, a second side opposite the first side, a third side between the first side and the second side, and a fourth side opposite the third side;
   a first LED board mounted directly to the first side of the lighting housing;
   a first shroud releasably securable to the lighting housing and covering the first LED board;
   a coolant passage formed within the lighting housing, said coolant passage running from the first end to the second end of the lighting housing; and
   a coolant liquid receivable through the coolant passage;
   wherein the coolant liquid passes through the coolant passage providing active cooling of the lighting housing from heat created by the first LED board; wherein a first T-slot is formed in the third side of the lighting housing and a second T-slot is formed in the fourth side of the lighting housing; wherein the first T-slot and the second T-slot are each defined by a narrow slot leading to an orthogonally positioned wide slot; and wherein the first T-slot and the second T-slot are sized to accommodate attachments that slide into or are otherwise secured to at least one of the first T-slot and the second T-slot respectively, said attachments selected from the group consisting of mounting brackets, heat sinks, and fin-type condensers.

2. The lighting system of claim 1, further comprising:
a pair of spaced-apart first channels formed in the first side of the lighting housing, wherein each of said spaced-apart first channels extend the length of said lighting housing from the first end to the second end;
wherein the first LED board is releasably mounted to the first side of the lighting housing by a plurality of screws receivable within the spaced-apart first channels.

3. The lighting system of claim 1, further comprising:
a second LED board mounted directly to the second side of the lighting housing; and
a second shroud releasably securable to the lighting housing and covering the second LED board.

4. The lighting system of claim 3, further comprising:
a pair of spaced-apart second channels formed in the second side of the lighting housing, wherein each of said spaced-apart second channels extend the length of said lighting housing from the first end to the second end;
wherein the second LED board is releasably mounted to the second side of the lighting housing by a plurality of screws receivable within the spaced-apart second channels.

5. The lighting system of claim 1, further comprising:
a heat conductive material positioned between the first LED board and the first side of the lighting housing, said heat conductive material selected from the group consisting of thermal pastes and heat sink tapes.

6. The lighting system of claim 3, further comprising:
a heat conductive material positioned between the second LED board and the second side of the lighting housing, said heat conductive material selected from the group consisting of thermal pastes and heat sink tapes.

7. The lighting system of claim 1, wherein the first LED board is constructed with LEDs emitting percentages of at least one of red, blue and white light depending on the crop they will be used for and user preference.

8. The lighting system of claim 1, wherein the first shroud has a first edge and a second edge, the first edge and second edge of the first shroud being bent inward to be receivable in a set of first grooves formed in the lighting housing.

9. The lighting system of claim 3, wherein the second shroud has a first edge and a second edge, the first edge and second edge of the second shroud being bent inward to be receivable in a set of second grooves formed in the lighting housing.

10. The lighting system of claim 1, said lighting housing further comprising at least one heat fin extending inwardly into the coolant passage, wherein said at least one heat fin is integral to said lighting housing, and wherein said coolant liquid passing through said coolant passage is in direct contact with said at least one heat fin.

11. The lighting system of claim 1, further comprising:
a first end cap positionable over the first end of the lighting housing; and
a second end cap positionable over the second end of the lighting housing;
wherein the first end cap and the second end cap seal said lighting system and prevent moisture and debris from entering under the first shroud and reaching said first LED board.

12. A lighting system for indoor farming for delivering high intensity light while reducing or eliminating heat loads in a growing environment, the lighting system comprising:
a lighting housing fabricated from a metal and having a first end, a second end opposite the first end, a first side, a second side opposite the first side, a third side between the first side and the second side, and a fourth side opposite the third side;
a first LED board mounted directly to the first side of the lighting housing;
a first shroud releasably securable to the lighting housing and covering the first LED board;
a second LED board mounted directly to the second side of the lighting housing;
a second shroud releasably securable to the lighting housing and covering the second LED board;
a coolant passage formed within the lighting housing, said coolant passage running from the first end to the second end of the lighting housing; and
a coolant liquid receivable through the coolant passage;
wherein the coolant liquid passes through the coolant passage providing active cooling of the lighting housing from heat created by the first LED board and the second LED board; wherein a first T-slot is formed in the third side of the lighting housing and a second T-slot is formed in the fourth side of the lighting housing; wherein the first T-slot and the second T-slot are each defined by a narrow slot leading to an orthogonally positioned wide slot; and wherein the first T-slot and the second T-slot are sized to accommodate attachments that slide into or are otherwise secured to at least one of the first T-slot and the second T-slot respectively, said attachments selected from the group consisting of mounting brackets, heat sinks, and fin-type condensers.

13. The lighting system of claim 12, further comprising:
a pair of spaced-apart first channels formed in the first side of the lighting housing, wherein each of said spaced-apart first channels extend the length of said lighting housing from the first end to the second end; and
a pair of spaced-apart second channels formed in the second side of the lighting housing, wherein each of said spaced-apart second channels extend the length of said lighting housing from the first end to the second end;
wherein the first LED board is releasably mounted to the first side of the lighting housing by a plurality of first screws receivable within the spaced-apart first channels; and
wherein the second LED board is releasably mounted to the second side of the lighting housing by a plurality of second screws receivable within the spaced-apart second channels.

14. The lighting system of claim 12, further comprising:
a first heat conductive material positioned between the first LED board and the first side of the lighting housing; and
a second heat conductive material positioned between the second LED board and the second side of the lighting housing, said first and second heat conductive materials selected from the group consisting of thermal pastes and heat sink tapes.

15. The lighting system of claim 12, wherein the first shroud has a first edge and a second edge, the first edge and second edge of the first shroud being bent inward to be receivable in a set of first grooves formed in the lighting housing and wherein the second shroud has a first edge and a second edge, the first edge and second edge of the second shroud being bent inward to be receivable in a set of second grooves formed in the lighting housing.

16. The lighting system of claim 12, said lighting housing further comprising at least one heat fin extending inwardly into the coolant passage, wherein said at least one heat fin is integral to said lighting housing, and wherein said coolant liquid passing through said coolant passage is in direct contact with said at least one heat fin.

17. The lighting system of claim 12, further comprising:
- a first end cap positionable over the first end of the lighting housing; and
- a second end cap positionable over the second end of the lighting housing;
- wherein the first end cap and the second end cap seal said lighting system and prevent moisture and debris from entering under the first shroud and reaching said first LED board and entering under the second shroud and reaching said second LED board.

\* \* \* \* \*